United States Patent
Chen et al.

(10) Patent No.: US 10,200,843 B1
(45) Date of Patent: Feb. 5, 2019

(54) BLUETOOTH AUDIO ROLE-BASED SCHEDULING

(71) Applicant: Apple Inc., Cupertino, CA (US)

(72) Inventors: Camille Chen, Cupertino, CA (US); Siegfried Lehmann, Sunnyvale, CA (US); Hsin-Yao Chen, Castro Valley, CA (US); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/927,734

(22) Filed: Mar. 21, 2018

Related U.S. Application Data

(60) Provisional application No. 62/556,278, filed on Sep. 8, 2017.

(51) Int. Cl.
| | |
|---|---|
| *H04W 4/80* | (2018.01) |
| *H04W 76/14* | (2018.01) |
| *H04W 4/02* | (2018.01) |
| *H04W 72/14* | (2009.01) |
| *H04W 48/16* | (2009.01) |
| *H04W 84/12* | (2009.01) |

(52) U.S. Cl.
CPC ............... *H04W 4/80* (2018.02); *H04W 4/02* (2013.01); *H04W 48/16* (2013.01); *H04W 72/14* (2013.01); *H04W 76/14* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 7,020,487 | B2* | 3/2006 | Kimata | G01S 19/21 342/357.59 |
| 7,136,684 | B2* | 11/2006 | Matsuura | H04R 5/033 455/575.2 |
| 8,565,112 | B2* | 10/2013 | Peiris | H04M 1/7253 370/252 |
| 9,083,643 | B2* | 7/2015 | Everaere | G06F 1/3209 |
| 9,706,592 | B2* | 7/2017 | Peng | H04W 4/80 |
| 9,883,329 | B2* | 1/2018 | Ryu | H04L 69/24 |

(Continued)

*Primary Examiner* — Tuan A Tran
(74) *Attorney, Agent, or Firm* — Morgan, Lewis & Bockius LLP

(57) ABSTRACT

In the subject system for Bluetooth audio role-based scheduling, an electronic device (e.g., a mobile phone), may receive streaming audio over a cellular connection, e.g. LTE, and may stream the audio to a head unit of a vehicle, e.g. via Bluetooth. The electronic device may also concurrently communicate with other electronic devices via, e.g., Wi-Fi, Bluetooth, and/or BTLE. The electronic device may determine the Bluetooth/communication capabilities of the HU device, such as buffer size, and the electronic device may proactively configure Bluetooth settings/parameters for communicating with the HU device based on the capabilities of the HU device. The electronic device may also adaptively modify scheduling for communications with other electronic devices based on the determined capabilities of the HU device. In this manner, the electronic device can proactively mitigate and/or prevent the sub-optimal user experience caused by any differences in Bluetooth/communication capabilities of the HU device and the electronic device.

20 Claims, 10 Drawing Sheets

(56) References Cited

U.S. PATENT DOCUMENTS

| | | | | |
|---|---|---|---|---|
| 2006/0287014 A1* | 12/2006 | Matsuura | ............... | H04R 5/033 |
| | | | | 455/575.2 |
| 2010/0267376 A1* | 10/2010 | Saari | ........................ | G06F 8/38 |
| | | | | 455/418 |
| 2016/0100276 A1* | 4/2016 | Viswanadham | ........ | H04W 4/80 |
| | | | | 455/41.2 |
| 2016/0286589 A1* | 9/2016 | Peng | ........................ | H04W 4/80 |
| 2017/0237814 A1* | 8/2017 | Zhang | .................... | H04W 4/80 |
| | | | | 709/201 |
| 2018/0115747 A1* | 4/2018 | Bayley | .................. | H04N 7/142 |

\* cited by examiner

BLUETOOTH AUDIO ROLE-BASED SCHEDULING

CROSS-REFERENCE TO RELATED APPLICATIONS

The present application claims the benefit of U.S. Provisional Patent Application Ser. No. 62/556,278, entitled "Bluetooth Audio Role-Based Scheduling," filed on Sep. 8, 2017, which is hereby incorporated by reference in its entirety for all purposes.

TECHNICAL FIELD

The present description relates generally to role-based scheduling of wireless communications, including scheduling wireless communications of an electronic device based on a role of the electronic device in a Bluetooth audio connection.

BACKGROUND

In wireless communication, the Bluetooth communication protocol has been widely used to connect multiple devices. For example, a mobile phone may be able to transmit audio data to a speaker via Bluetooth communication, such that the speaker may play audio that is being wirelessly transmitted from the mobile phone. With the advancement of technologies, an increasing number of vehicles are equipped with head unit (HU) devices capable of managing and performing various tasks, such as audio playback, map navigation, wireless communication, etc. An HU device may also have Bluetooth communication capability for communicating with an electronic device. With the Bluetooth communication capability of the HU device, the electronic device may perform various tasks through the HU device, such as forwarding a telephone call to the HU device, streaming music to the HU device, etc.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
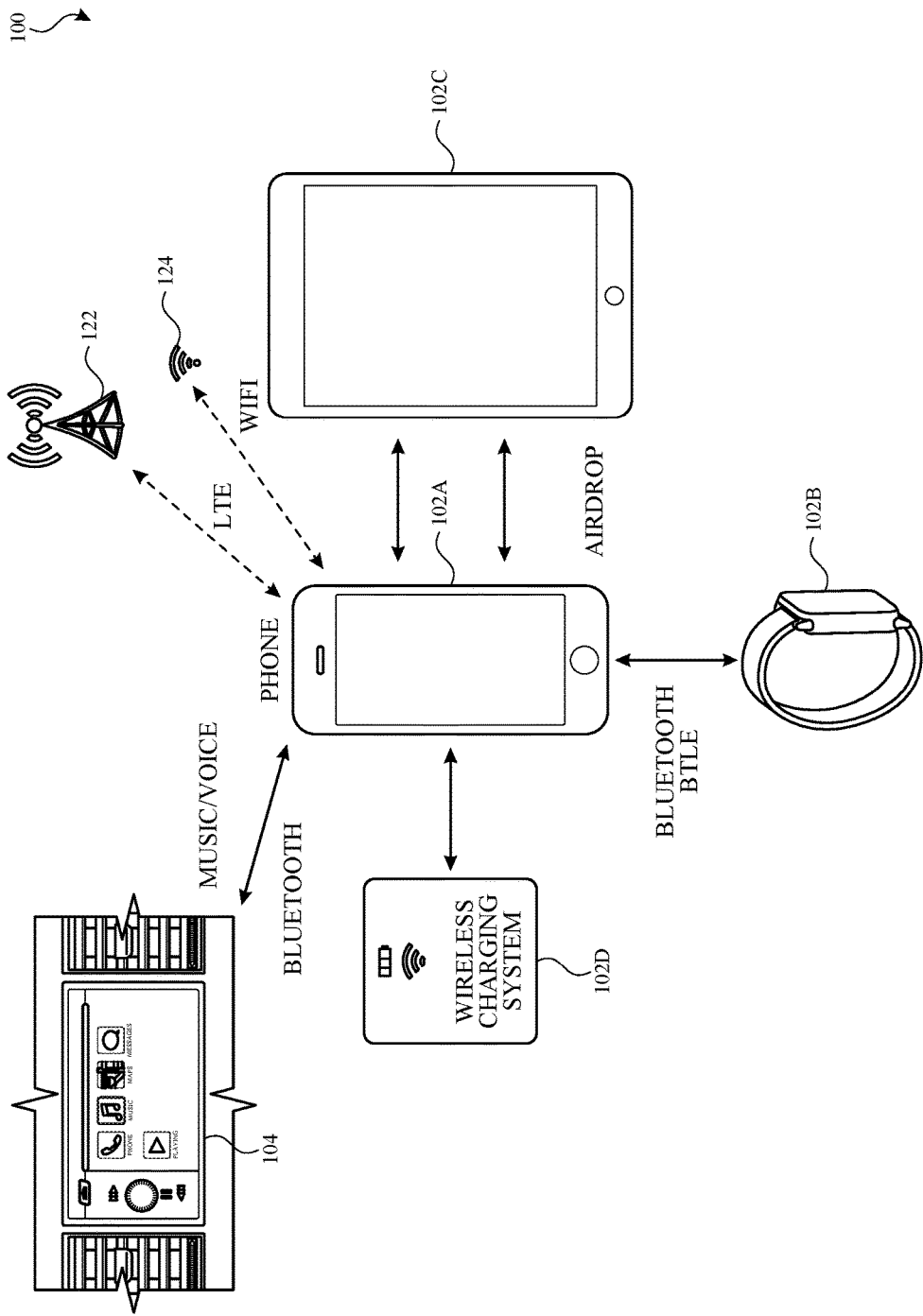
FIG. 1 illustrates an example network environment in which a Bluetooth audio role-based scheduling system may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more implementations, structures and components are shown in block diagram form in order to avoid obscuring the concepts of the subject technology.

Bluetooth communication has been widely used for communication between various electronic devices. The Bluetooth specification, which provides the framework for Bluetooth communication, has been regularly updated over time to provide new features/improvements. Thus, the Bluetooth capabilities of a given electronic device, such as HU device of a vehicle, may vary depending on the Bluetooth specification that is implemented by the HU device and/or the software capabilities of the HU device. By way of example, since vehicle manufacturers may be reluctant to update the firmware/software of the HU device of a vehicle, e.g., due to high cost, safety and security concerns, etc., the HU device of a vehicle may not implement the most up-to-date communication capabilities/specifications, even at the time that the vehicle is first released. This also is true of other wireless devices that may enter the market without an upgrade path.

As a result, an electronic device, such as a phone or tablet (and/or other electronic devices paired thereto), connected to a HU device of the vehicle, may have different and/or more advanced communication and/or Bluetooth capabilities than the HU device of the vehicle. The differences in Bluetooth capabilities between the devices may result in a sub-optimal user experience when, for example, audio is streaming from the electronic device to the head unit device via Bluetooth. The sub-optimal user experience, such as audio glitches, resulting from the differences in Bluetooth capabilities may be magnified when the electronic device is concurrently (e.g., overlapping in time) communicating with one or more additional electronic devices that have similar communication capabilities as the electronic device, such as any/all of a smart watch, wireless charger, headphones, etc. In this instance, the electronic devices may utilize advanced role-switching and/or scheduling techniques that the HU device may be incapable of performing and/or unwilling to perform, and the rigidity in the scheduling of the HU device may impede the electronic devices' implementation of these techniques.

In the subject system for Bluetooth audio role-based scheduling, the electronic device, which may have more advanced Bluetooth/communication capabilities than, e.g., the head unit device, determines the Bluetooth/communication capabilities of the HU device, such as a buffer size of the HU device, whether the HU device supports role switching, etc., and the electronic device proactively configures one or more Bluetooth settings/parameters for communicating with the HU device based on the Bluetooth/communication capabilities of the HU device, e.g., to proactively mitigate any rigidity in the scheduling/configurability of the HU device. The electronic device may also adaptively modify scheduling for communications with other electronic devices, such as a smart watch, based on the determined Bluetooth/communication capabilities of the HU device, such as to further mitigate any rigidity in the scheduling of the HU device. In this manner, the electronic device, such as a phone or tablet, can proactively mitigate and/or prevent the sub-optimal user experience caused by the differences in Bluetooth/communication capabilities of the HU device and the electronic device(s).

FIG. 1 illustrates an example network environment 100 in which a Bluetooth audio role-based scheduling system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-D, an HU device 104, a cellular base station 122, and a wireless access point 124. The HU device 104 may be installed in, and/or communicatively coupled to a vehicle. For example, the HU device 104 may be communicatively coupled to one or more audio outputs of the vehicle, such as speakers. In one or more implementations, one or more of the electronic devices 102A-D may be located inside the vehicle, while the cellular base station 122 and/or the wireless access point 124 may be located outside of the vehicle. The HU device 104, the cellular base station 122, and/or the wireless access point 124, may be, and/or may include all or part of, the electronic system discussed below with respect to FIG. 10. The HU device is presented as an example, and in other implementations, another device (e.g., that serves as a primary device (BT master) but does not support all current functionality) may be substituted for the HU device.

The electronic devices 102A-D may be, for example, portable computing devices such as laptop computers, smartphones, peripheral devices (e.g., digital cameras, headphones), tablet devices, wearable devices (e.g., watches, bands, etc.), wireless charging devices, and/or other appropriate devices that include one or more wireless interfaces, such as one or more NFC radios, WLAN radios, Bluetooth radios, Zigbee radios, cellular radios, and/or other wireless radios. In FIG. 1, by way of example, the electronic device 102A is depicted as a mobile device, the electronic device 102B is depicted as a smartwatch, the electronic device 102C is depicted as a tablet device, and the electronic device 102D is depicted as a wireless charging device. One or more of the electronic devices 102A-D may be, and/or may include all or part of, the electronic device discussed below with respect to FIG. 2 and/or the electronic system discussed below with respect to FIG. 10.

The electronic device 102A may be connected to the HU device 104, for example, via Bluetooth, such as to wirelessly stream audio (e.g., advanced audio distribution profile (A2DP) data) to the audio output of the vehicle via the HU device 104. The electronic device 102A may also be concurrently connected to one or more of the other electronic devices 102B-D, the cellular base station 122, and/or the wireless access point 124 via a wireless communication protocol (e.g., Bluetooth, Wi-Fi, Zigbee, near field communication (NFC), etc.).

In the network environment 100, the electronic device 102A may be connected to the electronic device 102B via Bluetooth, and may be connected to the electronic device 102C via Bluetooth and/or WLAN. The electronic device 102A may be connected to the electronic device 102D via, e.g., Bluetooth, such as to communicate wireless charging status information. The electronic device 102A may also have a connection with the cellular base station 122 (e.g., via long-term evolution (LTE) communication), and/or the electronic device 102A may have a connection with, and/or may scan or detect the presence of, the wireless access point 124 (e.g., via WLAN communication, such as using one or more 802.11 protocols).

In one example, the electronic device 102A may be connected to the HU device 104 (e.g., via Bluetooth) to stream media (e.g., music, voice, etc.) to the HU device 104, and the HU device 104 may output the media via an audio output of the vehicle, such as speakers. The electronic device 102A may be concurrently connected to the electronic device 102B (e.g., via Bluetooth), such as to synchronize data with the electronic device 102B, and/or the electronic device 102A may be concurrently connected to the electronic device 102D (e.g., via Bluetooth), such as to communicate charging status information. In addition, the electronic device 102A may be concurrently connected to the electronic device 102C (e.g., via Wi-Fi), such as to transfer files, and/or the electronic device may be connected to the cellular base station 122 (e.g., via cellular), such as to make/receive calls and/or communicate cellular data. Furthermore, the electronic device 102A may be concurrently connected to, and/or may concurrently scan/detect the presence of, the wireless access point 124 (e.g., via Wi-Fi), such as while scanning for open networks and/or to facilitate a positioning determination.

The electronic device 102A may typically operate as the primary device (e.g., the master device) for Bluetooth communications with the other electronic devices 102B-D, where the other electronic devices 102B-D operate as secondary devices (e.g., slave devices). In this manner, the electronic device 102A can control the scheduling of Bluetooth communications with the other electronic devices 102B-D. Similarly, the electronic device 102A may request to be the primary device for Bluetooth communication with the HU device 104, when establishing a connection with the HU device 104. However, in some cases the HU device 104 may reject the request by the electronic device 102A to be the primary device, and therefore the electronic device 102A may become the secondary device for Bluetooth communication with the HU device 104. When the electronic device 102A is the secondary device for Bluetooth communication with the HU device 104, the electronic device 102A may have little or no control over the scheduling implemented by the HU device 104 for the Bluetooth communication.

As discussed above, the electronic device 102A may be a primary device with respect to connections with one or more of the other electronic devices 102B-D while the electronic device 102A is concurrently a secondary device with respect to the connection with the HU device 104. The electronic device 102A having disparate roles between the different Bluetooth connections (or Bluetooth networks) may be referred to as a scatternet. In such a scatternet example, the electronic device 102A may have to align with the scheduling and/or clock of the HU device 104 (e.g., since the HU device 104 is the primary device for the connection), while the electronic device 102A may cause the electronic devices 102B-D to align with the scheduling and/or clock of the electronic device 102A. Thus, in a scatternet example, the electronic device 102A may need to accommodate multiple different clocks and/or schedules, which may result in excessive packet latency and/or packet loss with respect to the Bluetooth communication with the HU device 104, thereby causing an audio glitch.

For example, when the HU device 104 is the primary device for the connection with the electronic device 102A, the HU device 104 may set a poll interval (e.g., a number of milliseconds) for the electronic device 102A that controls how frequently the HU device 104 polls the electronic device 102A to transmit data. If the poll interval is set by the HU device 104 to an interval that is too long, the electronic device 102A may be unable to transmit sufficient audio data to the HU device 104 to prevent a buffer underflow at the HU device 104 (and/or a buffer overflow at the electronic device 102A), which may result in an audio glitch. Furthermore, the poll interval may be a maximum interval between poll events, not necessarily a fixed interval between poll events, and therefore the electronic device 102A may not know with certainty when the next poll event will occur. Thus, in the scatternet example, the electronic device 102A may not be able to transmit data at a given poll event as the electronic device 102A may need to receive/transmit data with another of the electronic devices 102B-D and/or the wireless access point 124 at that time.

If the electronic device 102A does not transmit data to the HU device 104 at a given poll event, the HU device 104 may increase the poll interval, such as doubling the poll interval for each poll event that the electronic device 102A does not transmit data. Therefore, the poll interval may become very large if the electronic device 102A continues to defer the transmission of data to the HU device 104, and/or the electronic device 102A otherwise misses one or more poll events. Furthermore, if the electronic device 102A does not transmit data for an extended period of time, the data may accumulate in a transmit buffer (e.g., a Bluetooth transmit buffer) of the electronic device 102A, while data may run out of a receive buffer (e.g., a Bluetooth receive buffer) of the HU device 104, either of which may result in an audio glitch. Thus, the buffer sizes of the HU device 104 and the electronic device 102A, as well as the poll interval, may impact the number of poll events that the electronic device 102A may defer or miss without causing one or more audio glitches.

In addition, the electronic device 102A may have schedules for, e.g., Wi-Fi communication and/or Bluetooth communication, between the electronic device 102A and one or more of the other electronic devices 102B-D, the wireless access point 124, and/or for Wi-Fi scanning. However, when there is little or no Wi-Fi traffic, less frequent scheduling of Wi-Fi communication/scanning may be desirable to allow for more frequent and/or more flexible scheduling of Bluetooth communication with the HU device 104. Similarly, if one or more of the other electronic devices 102B-D is not being actively used by the user, e.g. when the user is driving, less frequent scheduling of Bluetooth and/or Wi-Fi communication with the one or more of the other electronic devices 102B-D may be desirable to allow for more frequent and/or more flexible scheduling of Bluetooth communication with the HU device 104.

Thus, the multiple concurrent connections of the electronic device 102A may result in excessive packet latency with respect to Bluetooth communications with the HU device 104, particularly when the electronic device 102A is in a scatternet and/or when the electronic device 102A and the HU device 104 have small transmit or receive buffers, respectively. The excessive packet latency may result in a suboptimal user experience with respect to streaming audio from the electronic device 102A to the HU device 104, e.g., the user may hear audio glitches. Example graphs showing the excessive packet latency caused by the HU device 104 are discussed further below with respect to FIGS. 8A and 9A.

The electronic device 102A may implement the subject Bluetooth audio role-based switching system to mitigate/control any detrimental impact on the Bluetooth communication with the HU device 104 when the electronic device 102A is concurrently connected to multiple other devices, such as one or more of the electronic devices 102B-D, the cellular base station 122, and/or the wireless access point 124. The subject system may allow the electronic device 102A to prevent and/or mitigate excessive packet latency, thereby mitigating and/or preventing any audio glitches resulting from the excessive latency. An example electronic device 102A implementing the subject system is discussed further below with respect to FIG. 2, and example processes of an electronic device 102A implementing the subject system are discussed further below with respect to FIGS. 3-7. Example graphs showing that the excessive packet latency caused by the HU device 104 is prevented/mitigated by the subject system is discussed further below with respect to FIGS. 8B and 9B.

Figure 2:
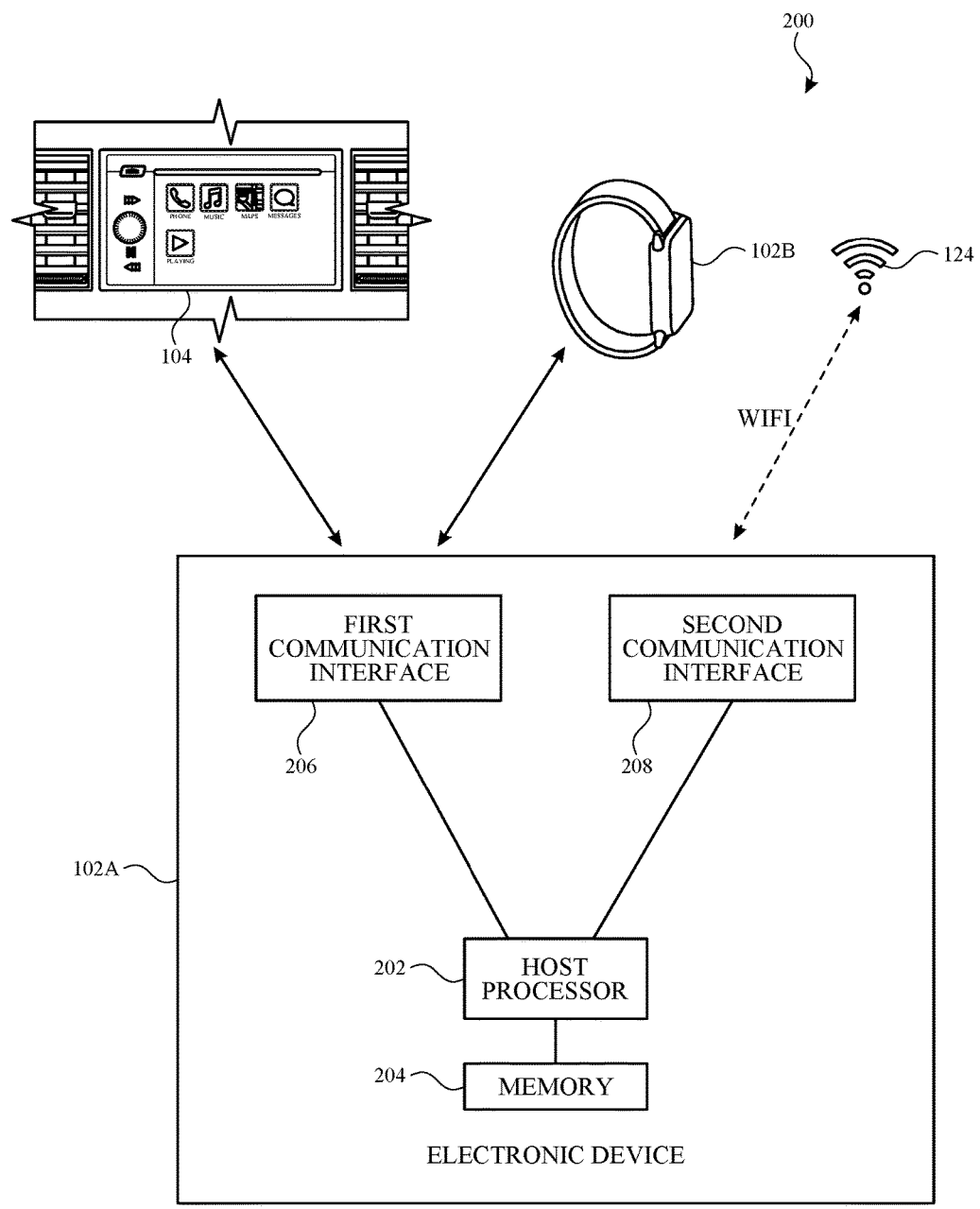
FIG. 2 illustrates an example network environment including an example electronic device that may implement a Bluetooth audio role-based scheduling system in accordance with one or more implementations.

FIG. 2 illustrates a network environment 200 including an example electronic device 102A that may implement a Bluetooth audio role-based scheduling system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 200 may include the electronic devices 102A-B, the HU device 104, and the wireless access point 124. The electronic device 102A may include, among other components, a host processor 202, a memory 204, a first communication interface 206 and a second communication interface 208. The host processor 202, which may also be referred to as an application processor or a processor, may include suitable logic, circuitry, and/or code that enable processing data and/or controlling operations of the electronic device 102A. In this regard, the host processor 202 may be enabled to provide control signals to various other components of the electronic device 102A.

The host processor 202 may also control transfers of data between various portions of the electronic device 102A. Additionally, the host processor 202 may enable implementation of an operating system or otherwise execute code to manage operations of the electronic device 102A. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The first communication interface 206 may be used by the host processor 202 to communicate via a first communication protocol, such as Bluetooth, BTLE, Zigbee, or NFC, and the second communication interface 208 may be used by the host processor 202 to communicate via a second communication protocol, such as Wi-Fi, cellular, Ethernet, or the like. In one or more implementations, the first communication interface 206 may be, may include, and/or may be communicatively coupled to a first radio frequency (RF) circuit, such as a Bluetooth circuit and/or an NFC circuit, and the second communication interface 208 may be, may include, and/or may be communicatively coupled to a second RF circuit, such as a WLAN circuit, a cellular RF circuit, or the like. In one or more implementations, the first communication interface 206 may include all or part of the second communication interface 208, for example, the Bluetooth circuit may be combined with the WLAN circuit.

In one or more implementations, one or more of the host processor 202, the memory 204, the first communication interface 206, the second communication interface 208, and/or one or more portions thereof, may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
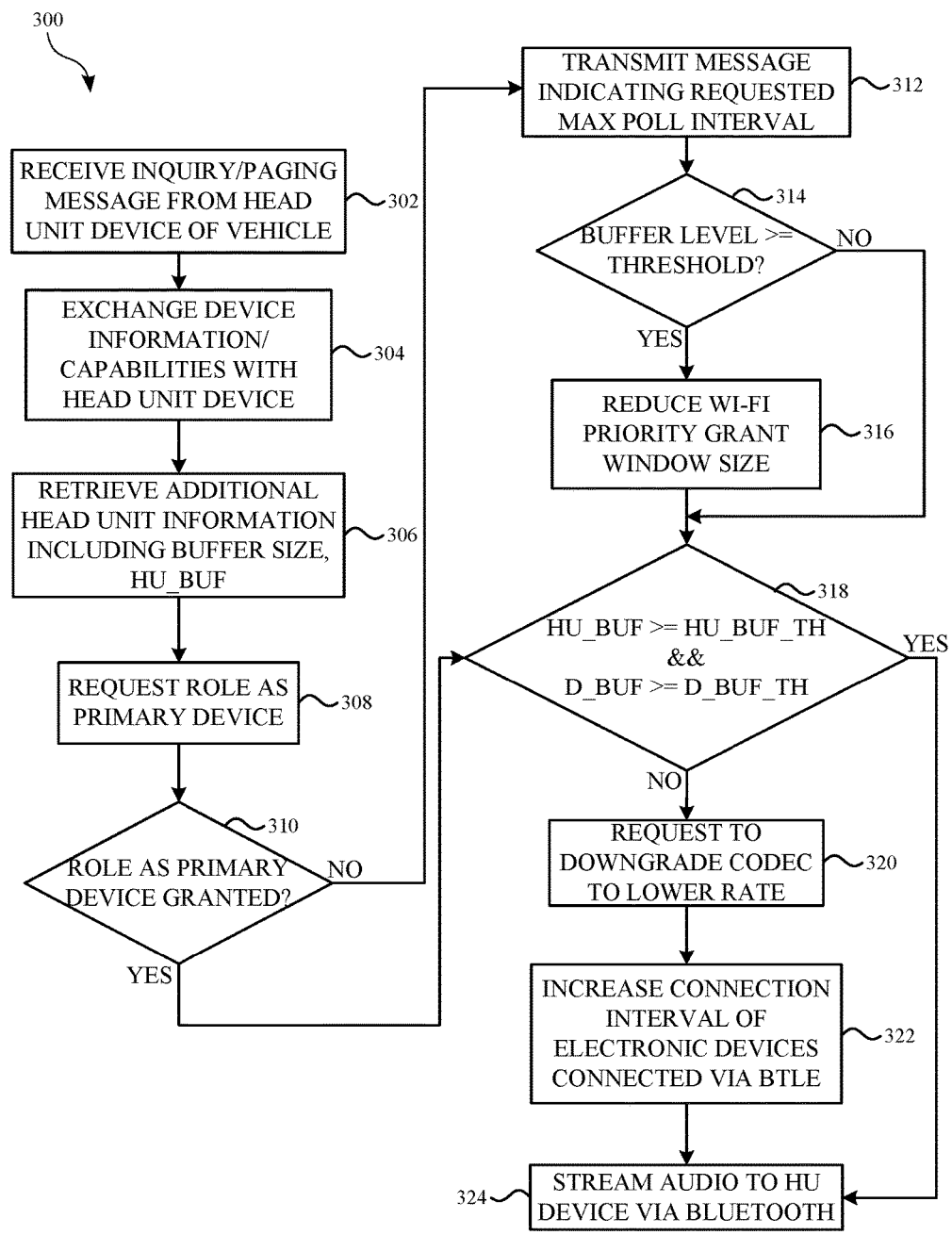
FIG. 3 illustrates a flow diagram of an example process of a Bluetooth audio role-based scheduling system in accordance with one or more implementations.

FIG. 3 illustrates a flow diagram of an example process 300 of a Bluetooth audio role-based scheduling system in accordance with one or more implementations. For explanatory purposes, the process 300 is primarily described herein with reference to the electronic device 102A of FIGS. 1-2. However, the process 300 is not limited to the electronic device 102A, and one or more blocks (or operations) of the process 300 may be performed by one or more other components of the electronic device 102A. The electronic device 102A is also presented as an exemplary device and the operations described herein may be performed by any suitable device, such as one or more of the other electronic devices 102B-D of FIG. 1. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more of the blocks of the process 300 need not be performed and/or can be replaced by other operations.

In the process 300, the electronic device 102A receives an inquiry/paging message (and/or other discovery message) from the HU device 104 of the vehicle (302). For example, the inquiry/paging message may be transmitted by the HU device 104 to identify other proximate electronic devices that are capable of communicating via, e.g., Bluetooth. In response to the inquiry/paging message, the electronic device 102A may exchange device information/capabilities with the HU device 104 of the vehicle (304). For example, the electronic device 102A may transmit its device information/capabilities to the HU device 104, and the electronic device 102A may receive, from the HU device 104, the device information/capabilities of the HU device 104 (304).

In one or more implementations, when the electronic device 102A and the HU device 104 exchange device information/capabilities, the HU device 104 may transmit initial identifying information associated with the HU device 104 to the electronic device 102A. The initial identifying information may be information from which the HU device 104 and/or the vehicle containing the HU device 104 can be identified (e.g., a manufacturer identifier and/or model identifier of the vehicle and/or the HU device 104, vehicle identification number (VIN), etc.). In one or more implementations, the exchanged device information/capabilities may further include the Bluetooth specification supported by the devices 102A, 104, communication features supported by the devices 102A, 104 (e.g. role switching), and the like.

Using the initial identifying information received from the HU device 104, the electronic device 102A retrieves additional information regarding the HU device 104, such as a buffer size (HU_BUF) of the HU device 104 (306). The buffer size may correspond to an audio buffer of the HU device 104, a Bluetooth receive buffer of the HU device 104, a Bluetooth audio receive buffer of the HU device 104, and/or generally any buffer that may be used by the HU device 104 to buffer data, such as Bluetooth audio data, received from the electronic device 102A. The additional information may further include information describing one or more hardware/software/communication features of the HU device 104. In one or more implementations, the HU device 104 may provide at least a portion of the additional information when exchanging device information/capabilities with the electronic device 102A. In one or more implementations, if the electronic device 102A receives the buffer size of the HU device 104 when exchanging device information/capabilities, the electronic device 102A may bypass retrieving the additional information (306).

In one or more implementations, the electronic device 102A may retrieve the additional information regarding the HU device 104 from a local data store (e.g., memory 204, a memory connected to the electronic device 102A). For example, the electronic device 102A may use at least a portion of the initial identifying information to lookup the additional information regarding the HU device 104 in a local database. Thus, the electronic device 102A may store a local database that is prepopulated with additional information regarding head unit devices (e.g., buffer sizes) that are factory installed in various different makes/models of vehicles where the additional information can be retrieved using information identifying a particular make (e.g. manufacturer) and/or model of a vehicle. In one or more implementations, such a database may be stored on a remote server and/or a cloud of devices and thus the electronic device 102A may transmit the initial identifying information to the remote server and/or the cloud of devices, to retrieve the additional information regarding the HU device 104.

After receiving the additional information regarding the HU device 104, the electronic device 102A may request that the HU device 104 grant a role switch such that the electronic device 102A may operate as the primary device (e.g., master device) for communications, e.g. Bluetooth communications, with the HU device 104 (308). In one or more implementations, the HU device 104 may typically by default operate as the primary device for Bluetooth communications with the electronic devices 102A-D. The HU device 104 may not by default operate as the primary device for communications with the HU device 104. However, the HU device 104 may grant a role switch, thereby allowing the electronic device 102A to operate as the primary device, e.g., when the HU device 104 supports role switching.

Since the electronic device 102A typically operates as the primary device for communications with the electronic devices 102B-D, the electronic device 102A may be able to avoid a scatternet when the electronic device 102A is allowed to operate as the primary device for the communications with the HU device 104. In this regard, when the electronic device 102A is operating as the primary device with respect to the HU device 104, the electronic device 102A may not need to wait for a poll event from the HU device 104 to transmit data to the HU device 104, and the electronic device 102A may have more control over allocating time/resources to Bluetooth communication with the HU device 104.

The electronic device 102A determines whether the role switch request was granted by the HU device 104 (310). If the role switch request is not granted (310), the electronic device 102A may transmit a message (e.g., link management protocol (LMP) quality of service (QoS) message) that indicates a maximum poll interval requested to be set by the HU device 104 (312). As discussed above, a long poll interval between a current poll event and a subsequent poll event may prevent the electronic device 102A from transmitting data, such as Bluetooth audio data, to the HU device 104 for an extended period of time, particularly if the electronic device 102A misses/defers a particular poll event, e.g., due to communications with the other electronic devices 102B-D. Thus, if the poll interval is set too high, and/or the electronic device 102A misses a particular poll event, a buffer overflow may occur at the electronic device 102A and/or a buffer underflow may occur at the HU device 104, e.g. dependent upon the respective buffer sizes, either of which may cause an audio glitch when streaming audio.

Thus, the electronic device 102A may transmit the message to the HU device 104 indicating the requested maximum poll interval in an attempt to control the poll interval set by the HU device 104 when the electronic device 102A is operating as the secondary device. In one or more implementations, the requested maximum poll interval may be determined based on the receive buffer size of the HU device 104 and/or the transmit buffer size of the electronic device 102A. For example, the requested maximum poll interval may be higher for a larger receive buffer size of the HU device 104 and/or a larger transmit buffer size of the electronic device 102A. In one or more implementations, the maximum poll interval may be, for example, approximately 10 milliseconds.

In one or more implementations, the HU device 104 may reject the maximum poll interval requested by the electronic device 102A. For example, the HU device 104 may determine that the maximum poll interval requested in the message is too short for the HU device 104 to properly service, and thus the HU device 104 may transmit a rejection message to the electronic device 102A. If the electronic device 102A receives the rejection message from the HU device 104, the electronic device 102A may determine another maximum poll interval by incrementally increasing the maximum poll interval (e.g., from 10 milliseconds to 20 milliseconds), and the electronic device 102A may transmit a second message to the HU device 104 indicating the requested second maximum poll interval. The electronic device 102A may continue to request slightly longer maximum poll intervals until one of the requested maximum poll intervals is accepted by the HU device 104.

In order to prevent a buffer overflow with respect to communications with the HU device 104 (which may cause an audio glitch), the electronic device 102A may monitor the level of the transmit buffer being used for transmitting data, such as Bluetooth audio data, to the HU device 104. The buffer may be, for example, part of the memory 204 of the electronic device 102A. In particular, the electronic device 102A may determine whether the current buffer level is greater than or equal to a buffer level threshold (314), where the current buffer level indicates the amount (e.g., percentage or bytes) of the buffer occupied by data (e.g., A2DP data to be streamed to the HU device 104). For example, if the electronic device 102A misses a poll event with the HU device 104, the electronic device 102A may accumulate several packets in the buffer that have not been streamed to the HU device 104, and therefore the current buffer level may increase due to the accumulated packets.

In one or more implementations, the buffer level threshold may be set based at least in part on the buffer size of the HU device 104 and/or the buffer size of the electronic device 102A, the maximum poll interval granted by the HU device 104, the current channel conditions (e.g., as indicated by bit error rate, etc.), and the like. For example, when the buffer level threshold is set to a percentage, the buffer level threshold may be set higher (e.g., at 80%) for a larger buffer size because a larger buffer may be able to handle a larger amount of data before buffer overflow than a smaller buffer, whereas the buffer level threshold may be set lower (e.g., 60%) for a smaller buffer size.

When the electronic device 102A determines that the buffer level satisfies the buffer level threshold (314), the electronic device 102A may attempt to reduce the Wi-Fi priority grant window size (316), e.g., in order to increase the transmission window size allocated for Bluetooth communications. In other words, by reducing the amount of time allocated to Wi-Fi communication (e.g., Wi-Fi 2.4 GHz communication that may share the same radio circuit and/or antenna(s) as Bluetooth communication), the electronic device 102A may increase an amount of time allocated for Bluetooth communication, such as the communications with the HU device 104. In this manner, the electronic device 102A may be able to transmit additional data out of the buffer and reduce the buffer level below the buffer level threshold. In one or more implementations, the electronic device 102A may reduce the Wi-Fi priority grant window size from, for example, 40 milliseconds to 20 milliseconds.

In one or more implementations, the electronic device 102A may determine a location of the electronic device 102A (e.g., via a location sensor such as a global positioning system (GPS) device), and adjust Wi-Fi scanning settings based on the location of the electronic device 102A. For example, the electronic device 102A may use the location to lookup or determine a number of known Wi-Fi networks in an area proximate to the location. If the number of Wi-Fi networks determined to be in the area proximate to the location is less than a threshold, the electronic device 102A may allocate less resources for W-Fi communication, e.g., such that more resources may be allocated to Bluetooth communication.

In one or more implementations, if the electronic device 102A determines that the vehicle is in motion, such as based on information received from an accelerometer and/or GPS information, the electronic device 102A may allocate more resources to Wi-Fi scanning for obtaining a location of the electronic device 102A (e.g., for navigation purposes) and may allocate less resources to Wi-Fi scanning for connecting to a Wi-Fi network (which will quickly become out of range when driving). On the other hand, if the electronic device 102A determines that the vehicle is not in motion, the electronic device 102A may allocate fewer resources to Wi-Fi scanning for obtaining a location of the electronic device 102A and may allocate more resources to Wi-Fi scanning for connecting to a Wi-Fi network.

Irrespective of whether the request of the electronic device 102A to operate as the primary device was granted by the HU device 104 (310), the electronic device 102A determines whether to adjust settings/parameters for communication with the HU device 104 based on the buffer size of the HU device 104 and/or the buffer size of the electronic device 102A. For example, if either the buffer of the electronic device 102A or the buffer of the HU device 104 is less than a respective threshold (318), the electronic device 102A may determine that buffer overflow/underflow is likely to occur unless communication settings/parameters are adjusted.

Thus, the electronic device 102A determines whether a buffer size, HU_BUF, of the HU device 104 (e.g., a receive buffer utilized for communication with the electronic device 102A) is greater than or equal to a HU buffer threshold, HU_BUF_TH, and whether a buffer size, D_BUF, of the electronic device 102A (e.g., a transmit buffer utilized for communication with the HU device 104) is greater than or equal to a device buffer threshold, D_BUF_TH (318). If both of the buffer sizes are greater than or equal to the respective thresholds (318), the electronic device 102A can proceed with streaming audio to the HU device 104 via a Bluetooth connection with the HU device 104 (324).

However, if either of the buffer sizes is less than the respective thresholds (318), the electronic device 102A may request that the HU device 104 downgrade to a lower rate codec (e.g., A2DP codec) for the Bluetooth audio (320). The lower rate codec, which uses less data than a higher rate codec, may prevent any buffer overflow/underflow when either of the buffer sizes is below the respective thresholds. In one or more implementations, the electronic device 102A may request that the HU device 104 use a lower rate codec based on an ambient noise level, e.g., irrespective of the respective buffer sizes. For example, if the ambient noise detected by the electronic device 102A (e.g., via a microphone) is high, a high quality codec may not be noticeable, and therefore a low quality codec, e.g., lower rate code, may suffice. In one or more implementations, the electronic device 102A may force a lower rate codec irrespective of whether the HU device 104 grants the request.

Further, if either of the buffer sizes is less than the respective thresholds (318), the electronic device 102A may increase a Bluetooth connection interval (CI) (e.g., BTLE CI) of another one of the electronic devices 102B-D (e.g., electronic device 102B) that is connected to the electronic device 102A via Bluetooth (e.g., BTLE) (322), where the Bluetooth CI is the time between two Bluetooth communication events between the electronic device 102A and the electronic device 102B. For example, the electronic device may increase the Bluetooth CI from 15 milliseconds to 30 milliseconds. By increasing the Bluetooth CI of the electronic device 102B, an amount of time spent by the electronic device 102A on Bluetooth communications with the electronic device 102B may be reduced so that the electronic device 102A may spend more time on Bluetooth communications with the HU device 104.

In one more implementations, if multiple of the electronic devices 102B-D are connected to the electronic device 102A, the electronic device 102A may assign a ranking to each second device and may adjust the Bluetooth CI based on the ranking. In such an example, the electronic device 102A may increase the Bluetooth CI more for a second device with a lower ranking than for a second device with a higher ranking. Thus, the electronic device 102A may assign a higher ranking to one of the electronic devices 102B-D that are providing data that is determined to be of higher importance, such as a heart monitor, and the electronic device 102A may assign a lower ranking to one or more of the electronic devices 102B-D that are providing data that is determined to be of lower importance, such as a watch.

FIGS. 4-7 illustrate a flow diagram of example processes 400-700 of a Bluetooth audio role-based scheduling system in accordance with one or more implementations. For explanatory purposes, the processes 400-700 are primarily described herein with reference to electronic device 102A of FIGS. 1-2. However, the processes 400-700 are not limited to the electronic device 102A, and one or more blocks (or operations) of the processes 400-700 may be performed by one or more other components of the electronic device 102A. The electronic device 102A also is presented as an exemplary device and the operations described herein may be performed by any suitable device, such as one or more of the other electronic devices 102B-D. Further for explanatory purposes, the blocks of the processes 400-700 are described herein as occurring in serial, or linearly. However, multiple blocks of the processes 400-700 may occur in parallel. In addition, the blocks of the processes 400-700 need not be performed in the order shown and/or one or more of the blocks of the processes 400-700 need not be performed and/or can be replaced by other operations.

In the process 400 of the Bluetooth audio role-based scheduling system, the host processor 202 of the electronic device 102A receives initial identifying information from a HU device 104 of a vehicle (402). In an aspect, the host processor 202 of the electronic device 102A may receive the initial identifying information from the HU device 104 via the first communication interface 206 (e.g., via Bluetooth communication) and/or via the second communication interface 208 (e.g., via WLAN communication). The host processor 202 of the electronic device 102A obtains HU device information about the HU device 104 based on the initial identifying information (404), where the head unit device information includes buffer information of the HU device 104.

In one or more implementations, the initial identifying information may include HU-specific information (e.g., a manufacturer name and a model number of the vehicle containing the HU device 104, a model number of the HU device 104, etc.). Thus, the host processor 202 may be able to look up the buffer information corresponding to the HU device 104 based on the HU-specific information in the initial identifying information. In one or more implementations, the host processor 202 of the electronic device 102A may obtain the head unit device information from a database stored within the electronic device 102A or from a database stored in a remote server, e.g., cloud storage, via the second communication interface 208 (e.g., via cellular communication and/or WLAN communication).

The host processor 202 of the electronic device 102A transmits a primary device role request to the HU device 104 (406) via the first communication interface 206 (e.g., via Bluetooth communication), where the primary device role request indicates a request for the electronic device 102A to operate as the primary device with respect to communications with the HU device 104. As discussed above, the electronic device 102A may benefit from operating as the primary device when communicating with the HU device 104, particularly when the electronic device 102A is also communicating with other electronic devices 102B-D. However, the HU device 104 may reject the primary device role request.

The host processor 202 of the electronic device 102A determines whether the primary device role request is granted by the HU device 104 (408). If the primary device role request is not granted by the HU device 104 (408), the electronic device 102A may set the electronic device 102A to be the secondary device for communication with the HU device 104 (410), and the electronic device 102A may configure a poll interval setting and/or a WLAN communication setting, as discussed above. If the primary device role request is granted by the HU device 104 (408), the electronic device 102A may set the electronic device 102A to be the primary device for communication with the HU device 104 (414), and therefore the electronic device 102A may not need to adjust the poll interval and/or WLAN communication settings, e.g., because the electronic device 102A as a primary device may not need to wait for a poll event to transmit data to the HU device 104 and may have more control over resources allocated to the Bluetooth communication with the HU device 104.

Figure 4:
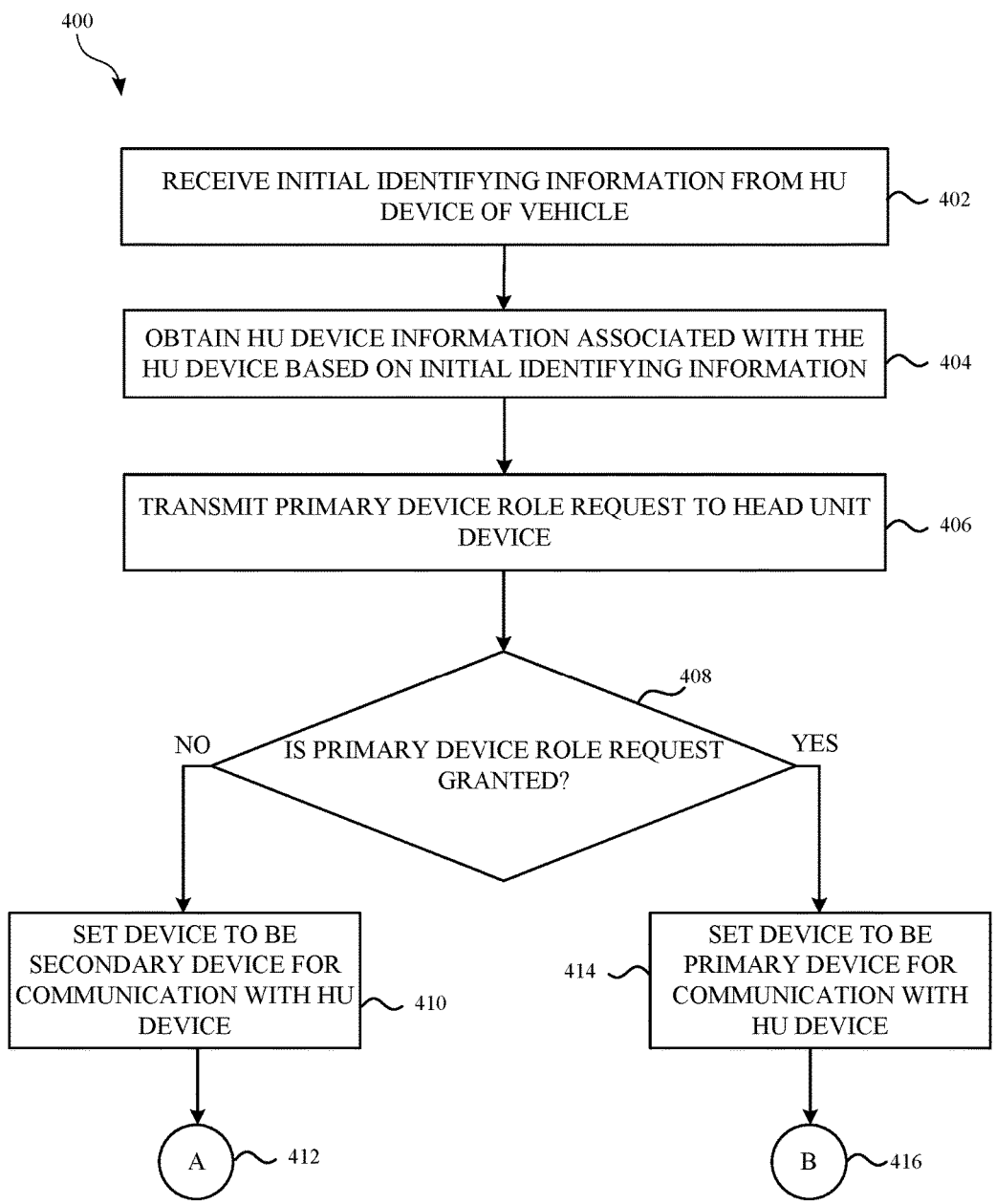
FIGS. 4-7 illustrate a flow diagram of an example process of a Bluetooth audio role-based scheduling system in accordance with one or more implementations.
Figure 5:
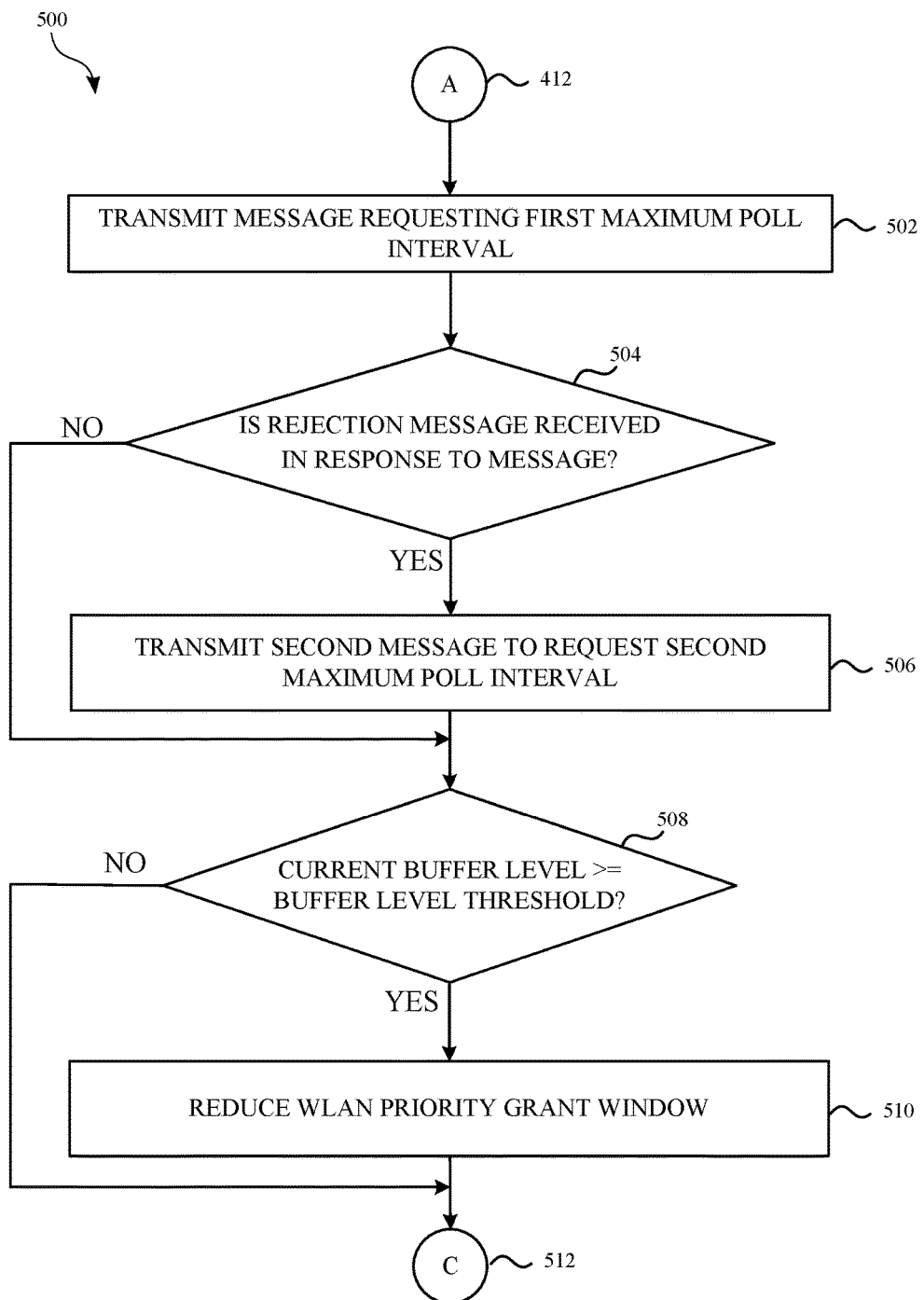

FIG. 5 illustrates a flow diagram of an example process 500 of a Bluetooth audio role-based scheduling system in accordance with one or more implementations, continuing from FIG. 4 when the primary device role request is granted by the HU device (408). At 412, the electronic device 102A continues from 412 of FIG. 4. The host processor 202 of the electronic device 102A transmits, to the HU device 104, a message requesting a first maximum poll interval to be set for the communications from the device to the head unit device (502), e.g., via the first communication interface 206 (e.g., via Bluetooth communication). The maximum poll interval is an upper limit when setting a poll interval for Bluetooth communication by the electronic device 102A, where the poll interval is a time between a current poll event and a subsequent poll event.

In some cases, the HU device 104 may reject the maximum poll interval requested in the message. Thus, the host processor 202 of the electronic device 102A determines whether the electronic device 102A has received a rejection message from the HU device 104 in response to the message requesting the maximum poll interval (504). If the host processor 202 has received the rejection message (e.g., via the first communication interface 206) (504), the electronic device 102A transmits, to the HU device 104, a second message to request a second maximum poll interval (e.g., via the first communication interface 206), where the second maximum poll interval is greater than the maximum poll interval (506). If the electronic device 102A does not receive a rejection message (504), the electronic device 102A does not need to send another message requesting a second maximum poll interval.

The host processor 202 of the electronic device 102A determines whether a current buffer level of the electronic device 102A is greater than or equal to a buffer level threshold (508). In one or more implementations, the host processor 202 may set the buffer level threshold based on a buffer size of the electronic device 102A. The buffer of the electronic device 102A may be located in the memory 204 of the electronic device 102A. If the current buffer level of the electronic device 102A is greater than or equal to the buffer level threshold, the host processor 202 reduces a WLAN priority grant window (510), where the size of the WLAN priority grant window may indicate a duration of time during which a priority is given to WLAN communication. For example, by reducing the WLAN priority grant window, more time may be allocated for the electronic device 102A to transmit data from the buffer of the electronic device 102A to the HU device 104, thereby preventing overflow of the buffer. If the current buffer level of the electronic device 102A is less than the buffer level threshold, the host processor 202 may not reduce the WLAN priority grant window (510).

Figure 6:
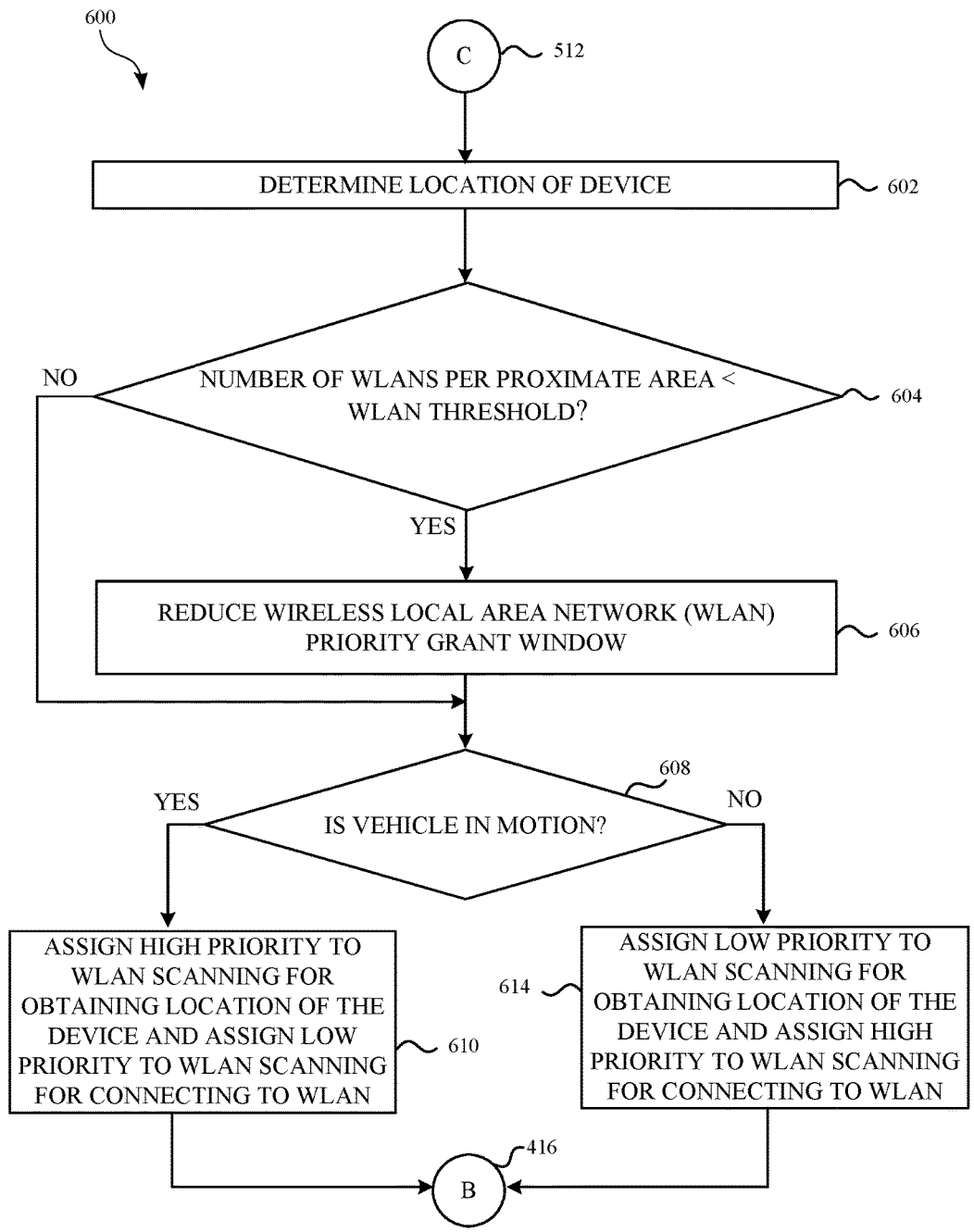

FIG. 6 illustrates a flow diagram of an example process 600 of a Bluetooth audio role-based scheduling system in accordance with one or more implementations, continuing from FIG. 5, when the primary device role request is granted by the HU device. At 512, the electronic device 102A continues from 512 of FIG. 5. The host processor 202 of the electronic device 102A determines a location of the electronic device 102A (602). The host processor 202 of the electronic device 102A then determines whether the location of the electronic device 102A indicates that a number of WLANs in a proximate area is less than a WLAN threshold (604). For example, the electronic device 102A may lookup whether there are any known Wi-Fi access points in an area proximate to the location of the electronic device 102A. It may not be desirable for the electronic device 102A to allocate a significant amount of time scanning for WLAN communication in an area that has little or no WLAN activity.

If the location of the electronic device 102A indicates that a number of WLANs in the proximate area is less than a WLAN threshold, the host processor 202 may reduce a WLAN priority grant window (606). For example, the electronic device 102A may allocate less time for WLAN communication/scanning in an area (e.g., rural area) with few WLANs within the proximity of the electronic device 102A. If the location of the electronic device 102A indicates that a number of WLANs in the proximate area is not less than the WLAN threshold, the host processor 202 may not reduce the WLAN priority grant window. For example, the electronic device 102A may not reduce time allocated for WLAN communication in an area (e.g., urban area) with many WLANs within the proximity of the electronic device 102A.

In one or more implementations, the number of WLANs in the proximate area may be estimated based on location information obtained from a location sensor (e.g., GPS device) and map data. For example, if the map data indicates that the location of the electronic device 102A is a rural area, the electronic device 102A may determine that the number of WLANs in the proximate area is less than the WLAN threshold. Alternatively, if the map data indicates that the electronic device 102A is located in an urban area, the electronic device 102A may determine that the location indicates the number of WLANs in the proximate area is greater than or equal to the WLAN threshold. The map data may further include information regarding a number of known WLANs in a particular location. In one or more implementations, the number of WLANs in the proximate area may be estimated based on a number of WLANs detected by the electronic device 102A when the electronic device 102A performs initial WLAN scanning.

The host processor 202 of the electronic device 102A determines whether the vehicle is in motion (608). The host processor 202 may determine whether the vehicle is in motion based on information from a sensor such as a GPS device, an accelerometer, etc. If the host processor 202 determines that the vehicle is in motion, the host processor 202 assigns a high priority to WLAN scanning for purposes of obtaining a location of the electronic device 102A and assigns a low priority to WLAN scanning for purposes of connecting to a WLAN (610). For example, while a user is driving the vehicle, the user may utilize the electronic device 102A for navigation purposes, which may be aided by location estimation based on WLAN scanning, but may not utilize the electronic device 102A to connect to a WLAN, since any such WLAN would quickly become out of range for WLAN transmissions. Hence, higher priority should be given to WLAN scanning for location estimation when the vehicle is in motion. The priority values may be used to schedule and/or prioritize transmission/scanning timeslots for WLAN in conjunction with scheduling Bluetooth communications (which may share the same antenna/radio, e.g. for 2.4 GHz Wi-Fi).

If the vehicle is not in motion, the host processor 202 assigns the low priority to WLAN scanning for purposes of obtaining a location of the electronic device 102A and assigns the high priority to WLAN scanning for purposes of connecting to a WLAN (614). For example, if a user is not driving the vehicle and thus the vehicle is not moving, the user may not utilize the electronic device 102A for navigation purposes, but may utilize the electronic device 102A to connect to a WLAN to perform communication. Hence, higher priority should be given to WLAN scanning for connecting to a WLAN when the vehicle is not in motion. In an aspect, the host processor 202 may assign the high priority by assigning a longer WLAN priority grant window, and may assign the low priority by assigning a shorter WLAN priority grant window.

Figure 7:
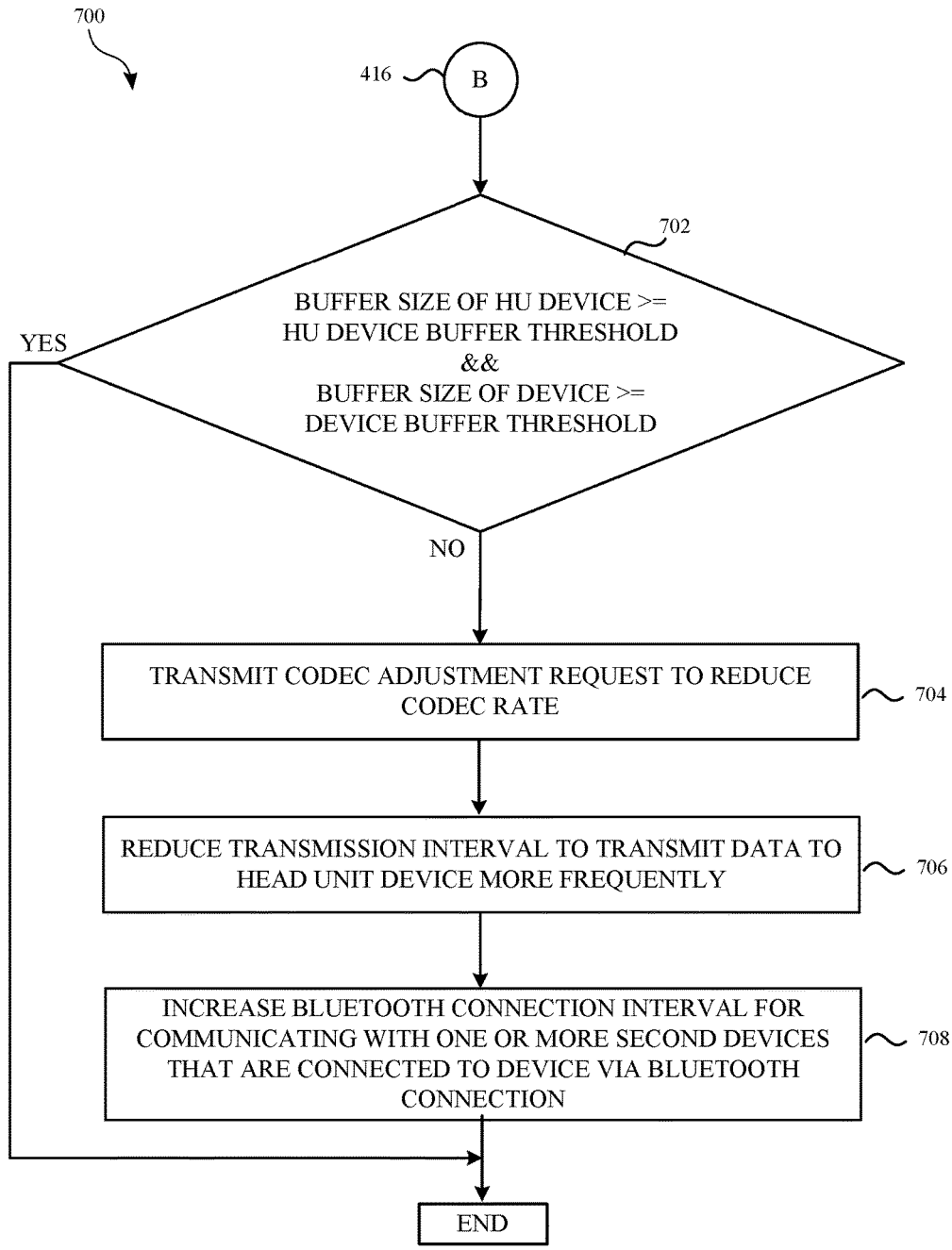

FIG. 7 illustrates a flow diagram of an example process 700 of a Bluetooth audio role-based scheduling system in accordance with one or more implementations, continuing from FIG. 1 or FIG. 6, where the example process 700 may be performed regardless of whether the primary device role request is granted by the HU device. At 416, the electronic device 102A continues from 416 of FIG. 1 or 416 of FIG. 5. In the example process 700, the host processor 202 of the electronic device 102A may configure one or more Bluetooth communication settings for communication with one or more devices including the HU device 104 based on the buffer information of the HU device 104.

In particular, to determine whether a buffer size condition is satisfied, the host processor 202 of the electronic device 102A determines whether a buffer size of the HU device 104 is greater than or equal to a HU device buffer threshold and whether a buffer size of the electronic device 102A is greater than or equal to a device buffer threshold (702), where the buffer size of the HU device 104 is determined from the buffer information included in the head unit device information. The buffer size condition is satisfied when the buffer size of the HU device 104 is greater than or equal to the HU device buffer threshold and the buffer size of the electronic device 102A is greater than or equal to the device buffer threshold. If the host processor 202 of the electronic device 102A determines that the buffer size of at least one of the electronic device 102A or the HU device 104 is less than the respective threshold (e.g., thus the buffer condition is satisfied), the electronic device 102A may adjust communication settings to compensate for the relatively smaller buffer size(s). If the buffer size of the HU device 104 is greater than or equal to the HU device buffer threshold and the buffer size of the electronic device 102A is greater than or equal to the device buffer threshold (e.g., thus the buffer size condition is satisfied), the electronic device 102A may bypass adjusting the communication settings.

For example, when the buffer size of at least one of the electronic device 102A or the HU device 104 is less than the threshold, the buffer(s) may not be large enough to stream audio data using a high data rate codec, and thus the host processor 202 of the electronic device 102A may transmit, to the HU device 104, a codec adjustment request to request a reduction in the codec rate (704), e.g., via the first communication interface 206. In one or more implementations, when the electronic device 102A is operating as the primary device, the host processor 202 of the electronic device 102A may reduce a transmission interval to transmit data to the HU device 104 more frequently (706) to prevent buffer overflow at the electronic device 102A and/or buffer underflow at the HU device 104.

In one or more implementations, the host processor 202 of the electronic device 102A may increase a Bluetooth connection interval for communicating with one or more other electronic devices 102B-D that are connected to the electronic device 102A via Bluetooth connection (708). In this manner, the amount of time allocated for communicating with the other electronic devices 102B-D can be reduced, and the additional time can be allocated to communications with the HU device 104.

Figure 8A:
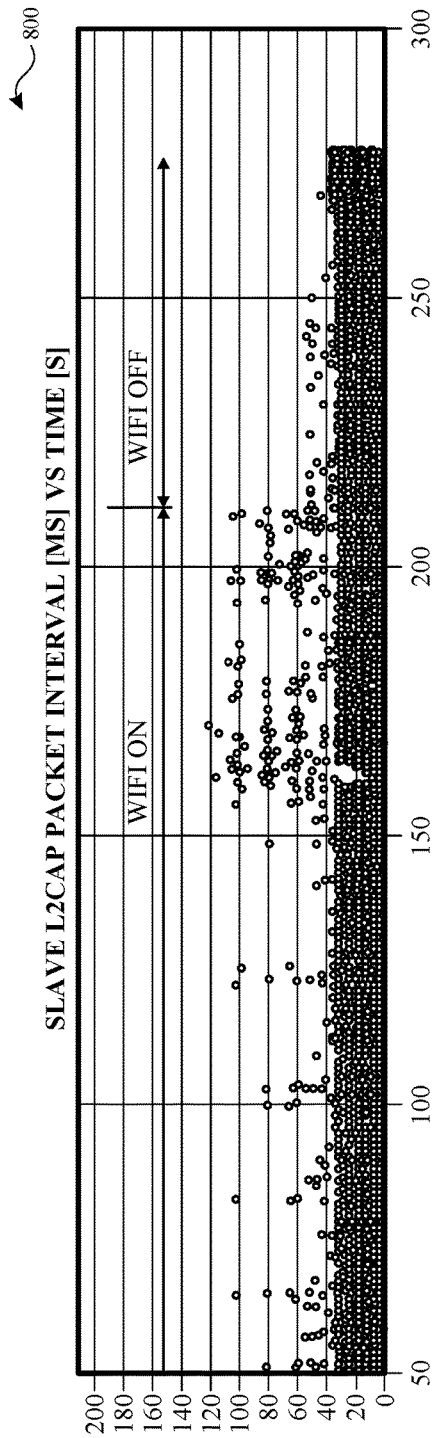
FIG. 8A illustrates a graph that includes example measurements of Bluetooth audio communication latency for conventional communications between an HU device and an electronic device.

FIG. 8A illustrates a graph 800 that includes measurements of Bluetooth audio communication latency for communications between an HU device 104 and an electronic device 102A in accordance with related art, e.g. when the subject system is not being implemented. The x-axis of the graph 800 represents time and the y-axis of the graph 800 represents an interval between successive audio packets, where the interval may be expressed as Bluetooth communication latency. When using Bluetooth communication to stream audio from the electronic device 102A to the HU device 104, audio glitches may be caused by excessive Bluetooth communication latency relative to the buffer size of the HU device 104. For example, latency greater than or equal to 100 milliseconds may cause audio glitches.

The graph 800 of FIG. 8A shows numerous instances where the Bluetooth communication latency exceeds 100 milliseconds when Wi-Fi is active, whereas there are no instances of the Bluetooth communication latency exceeding 100 milliseconds when Wi-Fi is inactive. Thus, the graph of FIG. 8A shows the effect of Wi-Fi on Bluetooth communication between the electronic device 102A and the HU device 104 when the subject system is not being implemented.

Figure 8B:
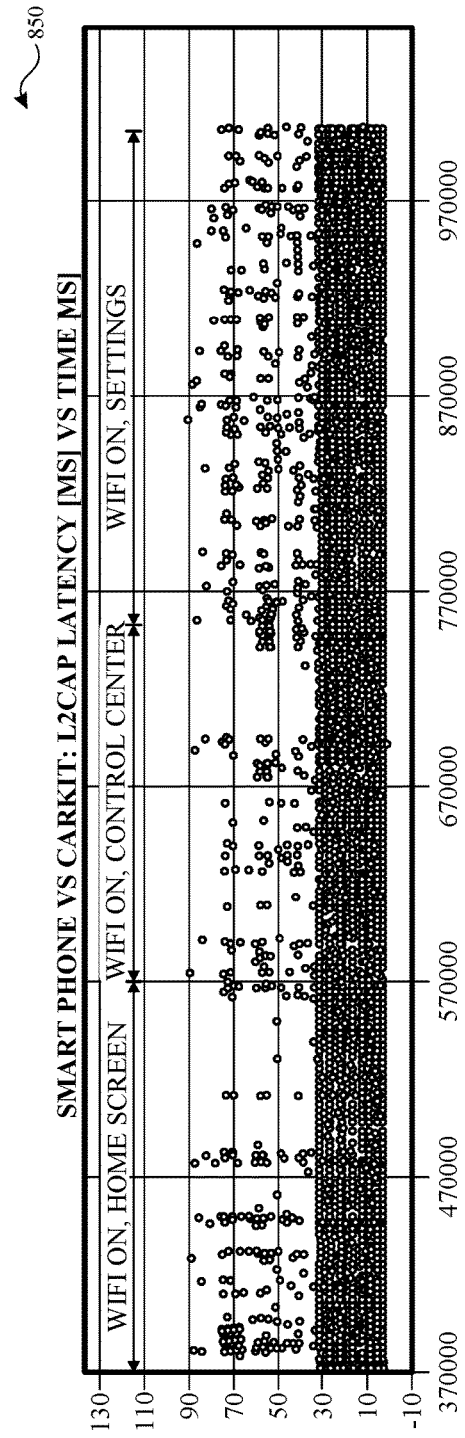
FIG. 8B illustrates a graph that includes example measurements of Bluetooth audio communication latency for communications between an HU device and an electronic device that is implementing a Bluetooth audio role-based scheduling system in accordance with one or more implementations.

FIG. 8B illustrates a graph 850 that includes measurements of Bluetooth audio communication latency for communications between an HU device 104 and an electronic device 102A that is implementing the subject Bluetooth audio role-based scheduling system in accordance with one or more implementations. The graph 850 of FIG. 8B does not show any instances where the Bluetooth communication latency is greater than or equal to 100 milliseconds, regardless of whether Wi-Fi is active or inactive. Accordingly, the graph 850 shows that the subject system is effective in minimizing audio glitches when using Bluetooth communication to stream audio data from the electronic device 102A to the HU device 104 irrespective of whether Wi-Fi is active.

Figure 9A:
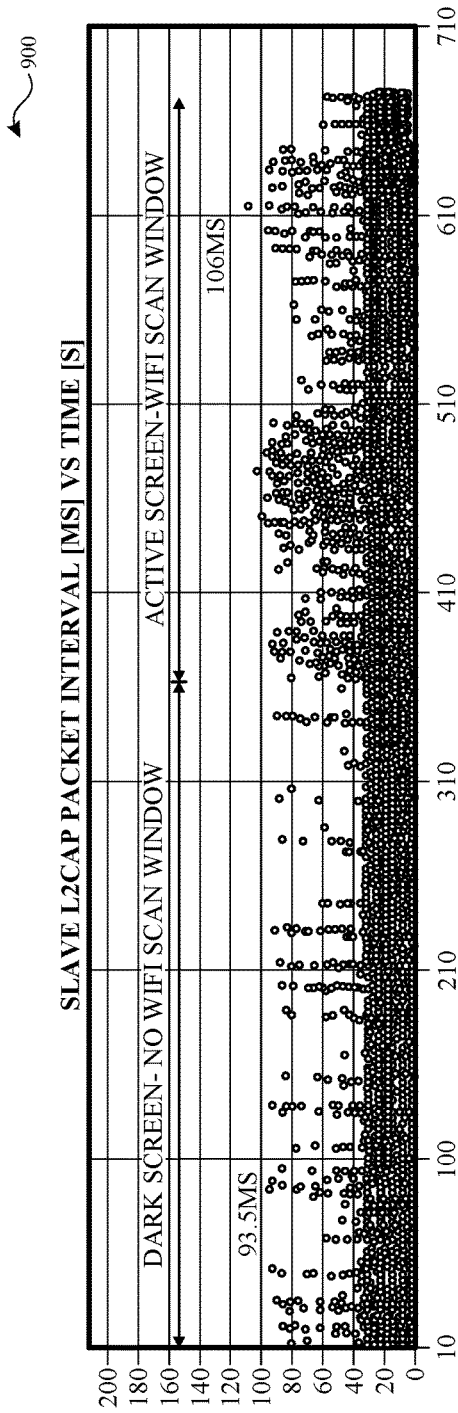
FIG. 9A illustrates a graph that includes example measurements of Bluetooth audio communication latency for conventional communications between an HU device and an electronic device.

FIG. 9A illustrates a graph 900 that includes measurements of Bluetooth audio communication latency for communications between an HU device 104 and an electronic device 102A in accordance with related art, e.g. when the subject system is not being implemented. The x-axis of the graph 900 represents time and the y-axis of the graph 900 represents an interval between successive audio packets, where the interval may be expressed as Bluetooth communication latency.

The graph 900 of FIG. 9A shows several instances where the Bluetooth communication latency is greater than or equal to 100 milliseconds when the screen of the electronic device 102A is turned on. For example, turning on the screen of the electronic device 102A may trigger Wi-Fi scanning and/or other activities of the electronic device 102A, which may adversely impact the Bluetooth communication between the electronic device 102A and the HU device 104. On the other hand, the graph 900 of FIG. 9A doesn't show any instances where the Bluetooth communication latency is greater than or equal to 100 milliseconds when the screen of the electronic device 102A is turned off. Thus, the graph 900 of FIG. 9A shows the effect of screen activation on Bluetooth communication between the electronic device 102A and the HU device 104 when the subject system is not being implemented.

Figure 9B:
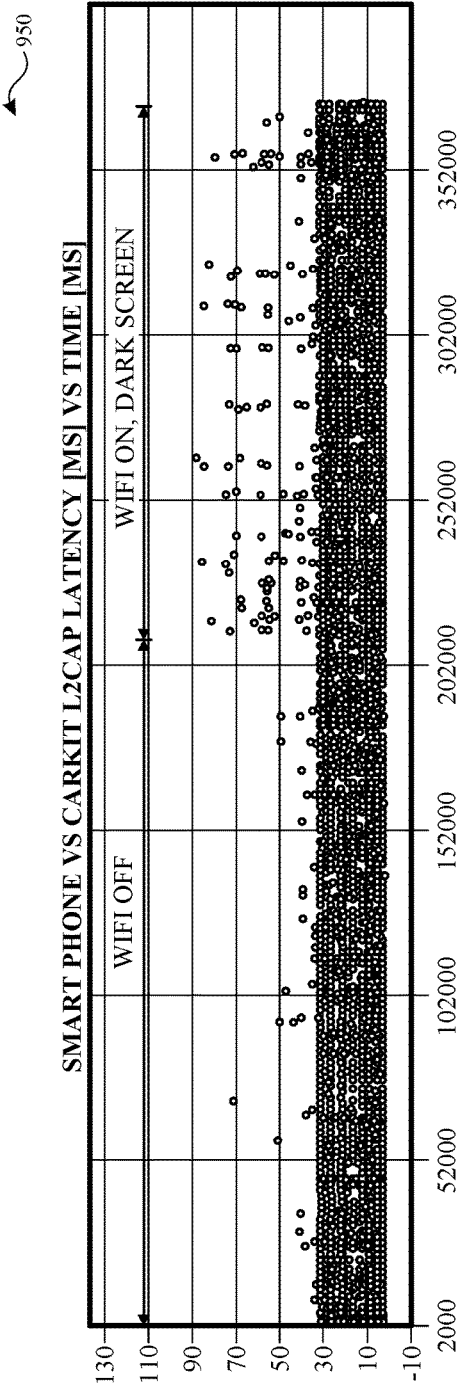
FIG. 9B illustrates a graph that includes example measurements of Bluetooth audio communication latency for communications between an HU device and an electronic device that is implementing the subject Bluetooth audio role-based scheduling system in accordance with one or more implementations.

FIG. 9B illustrates a graph 950 that includes measurements of Bluetooth audio communication latency for communications between an HU device 104 and an electronic device 102A that is implementing the subject Bluetooth audio role-based scheduling system in accordance with one or more implementations. The graph 950 of FIG. 9B doesn't show any instances where the Bluetooth communication latency is greater than or equal to 100 milliseconds regardless of whether the screen of the electronic device is on or off. Accordingly, the graph 950 shows that the subject system is effective in minimizing audio glitches when using Bluetooth communication to stream audio data from the electronic device 102A to the HU device 104 irrespective of Wi-Fi scanning or screen activation.

Figure 10:
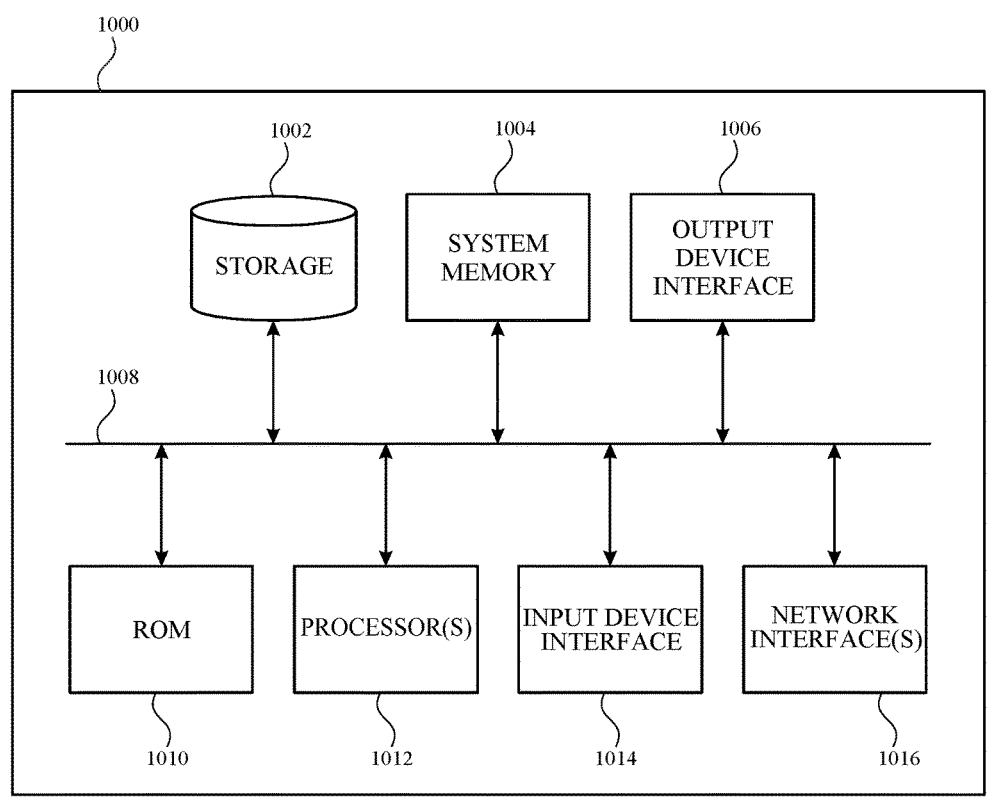
FIG. 10 illustrates an example electronic system with which aspects of the subject technology may be implemented in accordance with one or more implementations.

FIG. 10 illustrates an electronic system 1000 with which one or more implementations of the subject technology may be implemented. The electronic system 1000 can be, and/or can be a part of, one or more of the electronic devices 102A-D, the HU device 104, the cellular base station 122, and/or the wireless access point 124 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the cellular base station 122 or the wireless access point 124 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying," means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
 at least one processor configured to:
  receive initial identifying information from a head unit device;
  obtain head unit device information associated with the head unit device based at least on the initial identifying information, the head unit device information including buffer information associated with the head unit device; and
  configure one or more Bluetooth communication settings for communication with one or more devices, including the head unit device, based on the buffer information.

2. The device of claim 1, wherein the head unit device information is obtained from at least one of a database stored within the device or a database stored at a remote server.

3. The device of claim 1, wherein the head unit device information is not available from the head unit device.

4. The device of claim 1, wherein the at least one processor is further configured to:
 transmit a primary device role request to the head unit device, the primary device role request comprising a request for the device to assume a primary device role for communications with the head unit device; and
 set the device to be the primary device for communications with the head unit device when the primary device role request is granted by the head unit device.

5. The device of claim 4, wherein when the primary device role request is not granted by the head unit device, the at least one processor is further configured to:
 set the device to assume a secondary device role for the communications with the head unit device; and
 transmit, to the head unit device, a message requesting a first maximum poll interval to be set for the communications from the device to the head unit device.

6. The device of claim 5, wherein when the primary device role request is not granted by the head unit device, the at least one processor is further configured to:
 receive, from the head unit device, a rejection message in response to the primary device role request; and
 transmit, to the head unit device, a second message to request a second maximum poll interval, the second maximum poll interval being greater than the first maximum poll interval.

7. The device of claim 5, wherein when the primary device role request is not granted by the head unit device, the at least one processor is further configured to:
 determine whether a current buffer level of the device is greater than or equal to a buffer level threshold;
 reduce a wireless local area network (WLAN) priority grant window when the current buffer level of the device is greater than or equal to the buffer level threshold; and
 bypass reducing the WLAN priority grant window when the current buffer level of the device is less than the buffer level threshold.

8. The device of claim 7, wherein the buffer level threshold is set based at least on a buffer size of the device.

9. The device of claim 5, wherein the at least one processor is further configured to:
 determine a location of the device;
 reduce a wireless local area network (WLAN) priority grant window when the location of the device indicates that a number of WLANs in a proximate area is less than a WLAN threshold; and
 refrain from reducing the WLAN priority grant window when the location of the device indicates that the number of WLANs in the proximate area is greater than or equal to the WLAN threshold.

10. The device of claim 5, wherein the at least one processor is further configured to:
 determine whether a vehicle housing the head unit device is in motion;
 when the vehicle is determined to be in motion, assign a high priority to wireless local area network (WLAN) scanning for obtaining a location of the device and assign a low priority to WLAN scanning for connecting to a WLAN; and
 when the vehicle is not determined to be in motion, assign the low priority to WLAN scanning for obtaining the location of the device and assign the high priority to WLAN scanning for connecting to the WLAN.

11. The device of claim 10, wherein the high priority is assigned by assigning a longer WLAN priority grant window, and the low priority is assigned by assigning a shorter WLAN priority grant window.

12. The device of claim 1, wherein the at least one processor is configured to configure the one or more Bluetooth communication settings by:
 determining whether a buffer size condition is satisfied, wherein the buffer size condition is satisfied when a buffer size of the head unit device determined from the buffer information is greater than or equal to a head unit device buffer threshold and a buffer size of the device is greater than or equal to a device buffer threshold; and
 when the buffer size condition is not satisfied, performing at least one of:
  transmitting, to the head unit device, a codec adjustment request to reduce a codec rate;
  reducing a transmission interval to transmit data to the head unit device more frequently; or
  increasing a Bluetooth connection interval for communicating with one or more second devices that are connected to the device via Bluetooth connection.

13. A method, comprising:
 receiving, by a device, initial identifying information from a head unit device;
 obtaining, by the device, head unit device information associated with the head unit device based on the initial identifying information, the head unit device information including buffer information associated with the head unit device; and
 configuring, by the device, one or more Bluetooth communication settings for communication with one or more devices, including the head unit device, based at least on the buffer information.

14. The method of claim 13, further comprising:
 transmitting a primary device role request to the head unit device, the primary device role request comprising a request for the device to assume a primary device role for communications with the head unit device; and
 setting the device to be the primary device for the communications with the head unit device when the primary device role request is granted by the head unit device.

15. The method of claim 14, wherein, if the primary device role request is not granted by the head unit device, the method further comprises:
- setting the device to assume a secondary device role for the communications with the head unit device; and
- transmitting, to the head unit device, a message requesting a first maximum poll interval to be set by the head unit device for the communications with the device.

16. The method of claim 15, further comprising:
- receiving, from the head unit device, a rejection message in response to the message; and
- transmitting, to the head unit device, a second message to indicate a second maximum poll interval, the second maximum poll interval being greater than the first maximum poll interval.

17. The method of claim 15, further comprising:
- determining whether a current buffer level of the device is greater than or equal to a buffer level threshold;
- reducing a wireless local area network (WLAN) priority grant window when the current buffer level of the device is greater than or equal to the buffer level threshold; and
- bypassing reducing the WLAN priority grant window when the current buffer level of the device is less than the buffer level threshold.

18. The method of claim 13, wherein the configuring the one or more Bluetooth communication comprises:
- determining whether a buffer size condition is satisfied, wherein the buffer size condition is satisfied when a buffer size of the head unit device determined from the buffer information is greater than or equal to a head unit device buffer threshold and a buffer size of the device is greater than or equal to a device buffer threshold; and
- when the buffer size condition is not satisfied, performing at least one of:
  - transmitting, to the head unit device, a codec adjustment request to reduce a codec rate;
  - reducing a transmission interval to transmit data to the head unit device more frequently; or
  - increasing a Bluetooth connection interval for communicating with one or more second devices that are connected to the device via Bluetooth connection.

19. A system comprising:
- a first communication interface configured to communicate via one or more first communication protocols, including a Bluetooth communication protocol;
- a second communication interface configured to communicate via one or more second communication protocols, including a wireless local area network (WLAN) communication protocol; and
- at least one processor configured to:
  - receive, via the first communication interface, initial identifying information associated with a head unit device;
  - obtain, via the second communication interface, head unit device information associated with the head unit device based at least on the initial identifying information, the head unit device information including buffer information associated with the head unit device; and
  - configure one or more communication settings for communication, via the first or second communication interface, with one or more devices, including the head unit device based at least in part on the buffer information.

20. The system of claim 19, wherein the at least one processor is configured to:
- configure, based at least in part on the buffer information, one or more Bluetooth communication settings for communication via the first communication interface; and
- configure, based at least in part on at least one of the buffer information or the one or more Bluetooth communication settings, one or more WLAN communication settings for communication via the second communication interface.

* * * * *